United States Patent
Tang (10) Patent No.: US 11,335,144 B2
(45) Date of Patent: May 17, 2022

(54) METHOD FOR UNLOCKING INTELLIGENT LOCK, MOBILE TERMINAL, INTELLIGENT LOCK AND SERVER

(71) Applicant: YUNDING NETWORK TECHNOLOGY (BEIJING) CO., LTD., Beijing (CN)

(72) Inventor: Hao Tang, Beijing (CN)

(73) Assignee: YUNDING NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/517,378

(22) Filed: Jul. 19, 2019

(65) Prior Publication Data
US 2019/0362574 A1 Nov. 28, 2019

Related U.S. Application Data

(63) Continuation-in-part of application No. PCT/CN2018/073369, filed on Jan. 19, 2018.

(30) Foreign Application Priority Data

Jan. 21, 2017 (CN) .......................... 201710044914.1

(51) Int. Cl.
G07C 9/00 (2020.01)
G01S 19/13 (2010.01)
H04M 1/72409 (2021.01)

(52) U.S. Cl.
CPC ..... *G07C 9/00182* (2013.01); *G07C 9/00571* (2013.01); *H04M 1/72409* (2021.01);
(Continued)

(58) Field of Classification Search
CPC .......... G07C 2009/00246; G07C 2009/00261; G07C 2009/00412; G07C 2009/00769;
(Continued)

(56) References Cited

U.S. PATENT DOCUMENTS

| | | |
|---|---|---|
| 8,793,784 B2 | 7/2014 | Mfivier et al. |
| 2012/0213362 A1 | 8/2012 | Bliding et al. |

(Continued)

FOREIGN PATENT DOCUMENTS

| | | |
|---|---|---|
| CN | 202815965 U | 3/2013 |
| CN | 103700177 A | 4/2014 |

(Continued)

OTHER PUBLICATIONS

China National Intellectual Property Administration, Office Action, CN Patent Application No. 201710044914.1, dated Sep. 30, 2018, 12 pages.

(Continued)

*Primary Examiner* — Dionne Pendleton
(74) *Attorney, Agent, or Firm* — Fenwick & West LLP (57) ABSTRACT

Provided are a method for unlocking an intelligent lock, a mobile terminal, an intelligent lock and a server. The method includes following steps. A mobile terminal receives an initial key and a communication key from a server. The mobile terminal encrypts the initial key and preset key data by using the communication key to generate an unlocking verification code. The mobile terminal attaches the preset key data to the unlocking verification code, to obtain an unlocking verification code attached with the preset key data. The mobile terminal sends the unlocking verification code attached with the preset key data to the intelligent lock. The intelligent lock performs an unlocking operation based on the unlocking verification code attached with the preset key data.

5 Claims, 9 Drawing Sheets

(52) U.S. Cl.
CPC .............. *G07C 2009/00246* (2013.01); *G07C 2009/00261* (2013.01); *G07C 2009/00769* (2013.01)

(58) Field of Classification Search
CPC ............ G07C 2209/08; G07C 9/00182; G07C 9/00309; G07C 9/00571; G07C 2009/00404; G07C 9/10; G07C 9/27; H04M 1/66; H04M 1/72409; H04M 1/72463; H04L 9/3226; H04L 9/3242; H04L 2209/56; H04L 9/14; H04L 9/30; H04L 9/321; G06Q 20/20; G06Q 20/202; G06Q 20/3226; G06Q 20/327; G06Q 20/3278; G06Q 20/38215; G06Q 20/3829; G06Q 20/4012; G06Q 2220/00; G06Q 20/3821; G06Q 20/085; G06Q 20/12; G06Q 20/18; G06Q 20/206; G06Q 20/28; G06Q 20/308; G06Q 20/322; G06Q 20/3223; G06Q 20/326; G06Q 20/4014; G06Q 20/409; H04W 12/033; H04W 12/04; H04W 12/08; H04W 12/02; H04W 12/037; H04W 12/041; H04W 12/0431; H04W 12/0471; H04W 12/06; H04W 12/068; H04W 12/069; H04W 12/61; H04W 4/80; C02F 1/00; D01G 21/00; D06C 3/00; G01K 13/00; G01K 1/022; G01K 2205/00; G01K 2207/04; G01K 3/005; G06F 21/31; G06F 21/62; G07B 17/00193; G07B 2017/00491; G07F 17/0014; G08B 21/18
See application file for complete search history.

(56) References Cited

U.S. PATENT DOCUMENTS

| | | | |
|---|---|---|---|
| 2012/0233687 A1 | 9/2012 | Mfivier et al. | |
| 2016/0035163 A1* | 2/2016 | Conrad | G07C 9/00309 340/5.61 |
| 2016/0294556 A1* | 10/2016 | Vortriede | H04L 9/3226 |
| 2018/0047023 A1* | 2/2018 | Bouda | G06Q 20/3226 |
| 2018/0363327 A1 | 12/2018 | Kim | |

FOREIGN PATENT DOCUMENTS

| | | |
|---|---|---|
| CN | 103793960 A | 5/2014 |
| CN | 103955975 A | 7/2014 |
| CN | 103955982 A | 7/2014 |
| CN | 104008588 A | 8/2014 |
| CN | 104484917 A | 4/2015 |
| CN | 104660719 A | 5/2015 |
| CN | 104778773 A | 7/2015 |
| CN | 104952128 A | 9/2015 |
| CN | 105139491 A | 12/2015 |
| CN | 105184931 A | 12/2015 |
| CN | 204904392 U | 12/2015 |
| CN | 105279832 A | 1/2016 |
| CN | 105321240 A | 2/2016 |
| CN | 105608779 A | 5/2016 |
| CN | 105788050 A | 7/2016 |
| CN | 105871874 A | 8/2016 |
| CN | 105931485 A | 9/2016 |
| CN | 106340104 A | 1/2017 |
| CN | 106898065 A | 6/2017 |
| EP | 0688491 A1 | 9/1994 |
| EP | 2500872 A1 | 9/2012 |
| WO | WO 2012/077098 A1 | 6/2012 |
| WO | WO 2016/023558 A1 | 2/2016 |
| WO | WO 2016/204446 A1 | 12/2016 |

OTHER PUBLICATIONS

China National Intellectual Property Administration, Office Action, CN Patent Application No. 201880007809.3, dated Dec. 30, 2020, 28 pages.

PCT International Search Report, PCT Application No. PCT/CN2018/073369, dated Apr. 16, 2018, 14 pages.

* cited by examiner

METHOD FOR UNLOCKING INTELLIGENT LOCK, MOBILE TERMINAL, INTELLIGENT LOCK AND SERVER

CROSS-REFERENCE TO RELATED APPLICATIONS

This application is a continuation-in-part application of International Patent Application No. PCT/CN2018/073369, filed on Jan. 19, 2018, which claims priority to Chinese Patent Application No. 201710044914.1 filed with the China National Intellectual Property Administration on Jan. 21, 2017, both of which are incorporated by reference in their entireties.

FIELD

The disclosure relates to a method for unlocking an intelligent lock, belonging to the technical field of intelligent home and safe-protection.

BACKGROUND

The popularity of smartphones and Bluetooth low energy technology is increasing, and many applications enable smartphones to unlock via Bluetooth. An unlocking command transmitted by wireless communication is easier to be monitored, which increases the risk of stealing, tampering, and replaying the command.

Current solutions of unlocking via Bluetooth are described as follows. In a first solution, fixed communication content or a physical address of Bluetooth is used as communication content, if the communication content is acquired by being monitored and is replayed, encryption is deciphered. In a second solution, communication content is encrypted based on a physical address of Bluetooth, because the physical address of Bluetooth can be obtained through a monitoring tool, once the encryption algorithm is public, encryption is deciphered. In a third solution, encryption and authentication functions provided by the Bluetooth protocol is used, because all encrypted communications relate to a process of exchanging initial keys and generating long-term keys, as long as the process of exchanging initial keys is monitored, encryption is deciphered.

The security of unlocking via Bluetooth needs to be very high. Once encryption is deciphered, it may cause significant property damage.

SUMMARY

A method for unlocking an intelligent lock is provided according to an embodiment of the disclosure. The provided technical solutions are described as follows.

In a first aspect, a method for unlocking an intelligent lock is provided according to an embodiment of the disclosure. The method includes: receiving, by a mobile terminal, an initial key and a communication key from a server; encrypting, by the mobile terminal, the initial key and preset key data by using the communication key to generate an unlocking verification code; attaching, by the mobile terminal, the preset key data to the unlocking verification code, to obtain an unlocking verification code attached with the preset key data; and sending, by the mobile terminal, the unlocking verification code attached with the preset key data to the intelligent lock, where the intelligent lock performs an unlocking operation based on the unlocking verification code attached with the preset key data.

In an embodiment, the preset key data is a timestamp.

In an embodiment, the mobile terminal is provided with an up counter corresponding to the initial key, and the preset key data is a count value of the up counter. The count value of the up counter is incremented by one in response to the mobile terminal receiving the initial key and the communication key from the server.

In an embodiment, before the mobile terminal sends the unlocking verification code attached with the preset key data to the intelligent lock, the method further includes: establishing, by the mobile terminal, a connection with the intelligent lock in a wireless communication manner of Bluetooth, zigbee or WIFI.

In a second aspect, a method for unlocking an intelligent lock is provided according to an embodiment of the disclosure. The method includes: verifying, by the intelligent lock, a legality of an unlocking verification code attached with preset key data after the intelligent lock receives the unlocking verification code attached with the preset key data from a mobile terminal; and performing, by the intelligent lock, an unlocking operation based on the unlocking verification code in a case that the intelligent lock determines that the unlocking verification code is legal.

In an embodiment, the preset key data is a timestamp, and the verifying, by the intelligent lock, a legality of an unlocking verification code attached with preset key data after the intelligent lock receives the unlocking verification code attached with the preset key data from a mobile terminal includes: calculating, by the intelligent lock, a time period from the timestamp to a time of a local clock module of the intelligent lock, where the time of the local clock module is a standard time which is automatically matched and updated; determining that the unlocking verification code is illegal, in a case that the time period from the timestamp to the time of the local clock module is greater than a preset threshold; and determining that the unlocking verification code is legal, in a case that the time period from the timestamp to the time of the local clock module is not greater than the preset threshold.

In an embodiment, after the intelligent lock performs the unlocking operation based on the unlocking verification code, the method further includes: synchronizing, by the intelligent lock, the time of the local clock module with the timestamp.

In an embodiment, the preset key data is a count value of an up counter, and the verifying, by the intelligent lock, a legality of an unlocking verification code attached with preset key data after the intelligent lock receives the unlocking verification code attached with the preset key data from a mobile terminal includes: comparing, by the intelligent lock, the count value of the up counter attached to the unlocking verification code with a count value of a local counter of the intelligent lock; determining that the unlocking verification code is legal, in a case that the count value of the up counter is greater than the count value of the local counter; and determining that the unlocking verification code is illegal, in a case that the count value of the up counter is less than or equal to the count value of the local counter.

In an embodiment, after the intelligent lock performs the unlocking operation based on the unlocking verification code, the method further includes: updating, by the intelligent lock, the count value of the local counter to be the count value of the up counter.

In an embodiment, the performing, by the intelligent lock, an unlocking operation based on the unlocking verification code in a case that the intelligent lock determines that the unlocking verification code is legal includes: decoding, by the intelligent lock, the unlocking verification code by using the preset key data and a communication key locally stored in the intelligent lock to obtain a to-be-matched initial key, in a case that the intelligent lock determines that the unlocking verification code is legal; matching, by the intelligent lock, the to-be-matched initial key with an initial key locally stored in the intelligent lock; and performing, by the intelligent lock, the unlocking operation in a case that the to-be-matched initial key is successfully matched with the initial key locally stored in the intelligent lock.

In an embodiment, the performing, by the intelligent lock, an unlocking operation based on the unlocking verification code in a case that the intelligent lock determines that the unlocking verification code is legal includes: matching, by the intelligent lock, the unlocking verification code with a legal verification code locally generated in the intelligent lock in advance, in a case that the intelligent lock determines that the unlocking verification code is legal, where the legal verification code is generated by encrypting an initial key locally stored in the intelligent lock and the preset key data by using a communication key locally stored in the intelligent lock; and performing, by the intelligent lock, the unlocking operation in a case that the unlocking verification code is successfully matched with the legal verification code locally generated in the intelligent lock.

In a third aspect, a method for unlocking an intelligent lock is provided according to an embodiment of the disclosure. The method includes: sending, by a server, an initial key and a communication key to a mobile terminal and the intelligent lock, where the mobile terminal and the intelligent lock perform an unlocking operation based on the initial key and the communication key.

In an embodiment, the sending, by a server, an initial key and a communication key to a mobile terminal and the intelligent lock includes: sending, by the server, the initial key and the communication key to the mobile terminal and the intelligent lock through secure out-of-band transmission or a private encrypted channel.

In a fourth aspect, a mobile terminal is provided according to an embodiment of the disclosure. The mobile terminal includes a first receiving module, a first encrypting module, an attaching module and a first sending module. The first receiving module is configured to receive an initial key and a communication key from a server. The first encrypting module is configured to encrypt the initial key and preset key data by using the communication key to generate an unlocking verification code. The attaching module is configured to attach the preset key data to the unlocking verification code, to obtain an unlocking verification code attached with the preset key data. The first sending module is configured to send the unlocking verification code attached with the preset key data to an intelligent lock. The intelligent lock performs an unlocking operation based on the unlocking verification code attached with the preset key data.

In an embodiment, the preset key data is a timestamp.

In an embodiment, the mobile terminal is provided with an up counter corresponding to the initial key, and the preset key data is a count value of the up counter. The count value of the up counter is incremented by one in response to the mobile terminal receiving the initial key and the communication key from the server.

In an embodiment, the mobile terminal further includes a connection module configured to establish a connection with the intelligent lock in a wireless communication manner of Bluetooth, zigbee or WIFI.

In a fifth aspect, an intelligent lock is provided according to an embodiment of the disclosure. The intelligent lock includes a verifying module and an unlocking module. The verifying module is configured to verify a legality of an unlocking verification code attached with preset key data after the intelligent lock receives the unlocking verification code attached with the preset key data from a mobile terminal. The unlocking module is configured to perform an unlocking operation based on the unlocking verification code in a case that the intelligent lock determines that the unlocking verification code is legal.

In an embodiment, the preset key data is a timestamp, and the verifying module includes a first comparing sub-module, a first determining sub-module and a second determining sub-module. The first comparing sub-module is configured to calculate a time period from the timestamp to a time of a local clock module of the intelligent lock. The time of the local clock module is a standard time which is automatically matched and updated. The first determining sub-module is configured to determine that the unlocking verification code is illegal, in a case that the time period from the timestamp to the time of the local clock module is greater than a preset threshold. The second determining sub-module is configured to determine that the unlocking verification code is legal, in a case that the time period from the timestamp to the time of the local clock module is not greater than the preset threshold.

In an embodiment, the intelligent lock further includes a synchronizing module configured to synchronize the time of the local clock module with the timestamp.

In an embodiment, the preset key data is a count value of an up counter, and the verifying module includes a second comparing sub-module, a third determining sub-module and a fourth determining sub-module. The second comparing sub-module is configured to compare the count value of the up counter attached to the unlocking verification code with a count value of a local counter of the intelligent lock. The third determining sub-module is configured to determine that the unlocking verification code is legal, in a case that the count value of the up counter is greater than the count value of the local counter. The fourth determining sub-module is configured to determine that the unlocking verification code is illegal, in a case that the count value of the up counter is less than or equal to the count value of the local counter.

In an embodiment, the intelligent lock further includes an updating module configured to update the count value of the local counter to be the count value of the up counter.

In an embodiment, the unlocking module includes a decoding sub-module, a first matching sub-module and a first unlocking sub-module. The decoding sub-module is configured to decode the unlocking verification code by using the preset key data and a communication key locally stored in the intelligent lock to obtain a to-be-matched initial key, in a case that the intelligent lock determines that the unlocking verification code is legal. The first matching sub-module is configured to match the to-be-matched initial key with an initial key locally stored in the intelligent lock. The first unlocking sub-module is configured to perform the unlocking operation in a case that the to-be-matched initial key is successfully matched with the initial key locally stored in the intelligent lock.

In an embodiment, the unlocking module includes a second matching sub-module and a second unlocking sub-module. The second matching sub-module is configured to match the unlocking verification code with a legal verification code locally generated in the intelligent lock in advance, in a case that the intelligent lock determines that the unlocking verification code is legal. The legal verification code is generated by encrypting an initial key locally stored in the intelligent lock and the preset key data by using a communication key locally stored in the intelligent lock. The second unlocking sub-module is configured to perform the unlocking operation in a case that the unlocking verification code is successfully matched with the legal verification code locally generated in the intelligent lock.

In a sixth aspect, a server is provided according to an embodiment of the disclosure. The server includes a sending module configured to send an initial key and a communication key to a mobile terminal and an intelligent lock. The mobile terminal and the intelligent lock perform an unlocking operation based on the initial key and the communication key.

In an embodiment, the sending module is further configured to send the initial key and the communication key to the mobile terminal and the intelligent lock through secure out-of-band transmission or a private encrypted channel.

In the method for unlocking an intelligent lock according to the disclosure, the initial key and the preset key data are encrypted by using the communication key to generate the unlocking verification code, the transmission of the unlocking verification code can prevent the initial key and the communication key from being tampered, thereby ensuring the safety of unlocking the intelligent lock and avoid property damage.

The above description is only the overview of the technical solutions of the disclosure. Hereinafter, the present disclosure is described with embodiments, to understand the technical means of the present disclosure more clearly, implement the technical solutions based on the content of the specification, and to make the above and other objects, features and advantages of the present disclosure clearer and easier to be understood.

BRIEF DESCRIPTION OF THE DRAWINGS

By reading detailed description of the following preferred embodiments, various other advantages and benefits become clear to those skilled in the art. The drawings are only for illustrating the preferred embodiments, and are not intended to limit the present disclosure. In the drawings, the same reference numerals represent the same parts.

DETAILED DESCRIPTION OF EMBODIMENTS

In order to make those skilled in the art better understand the technical solutions of the present disclosure, the technical solutions in the embodiments of the present disclosure are described clearly and completely hereinafter in conjunction with the drawings in the embodiments of the present disclosure. Apparently, the described embodiments are only some rather than all of the embodiments of the present disclosure. Other embodiments obtained by those skilled in the art based on the embodiments in the present disclosure fall into the protection scope of the present disclosure.

In the specification, claims, and accompanying drawings of the present disclosure, the terms "first", "second", "third", "fourth", and the like (if existing) are intended to distinguish between similar objects rather than describe a specific order. It should be understood that the data used in this way are interchangeable under appropriate circumstances and the embodiments of the disclosure described herein can be implemented in sequences other than those illustrated herein. It should be noted that the terms such as "include", "comprise" or any other variants thereof are intended to be non-exclusive. For example, a process, method, system, product or device including a series of steps or elements may include not only the enumerated steps or elements but also other steps or elements that are not enumerated, or may include other steps or elements inherent for the process, method, system, product or device. Hereinafter, exemplary embodiments of the present disclosure are described in detail by referring to the drawings. Although the exemplary embodiments of the present disclosure are displayed in the drawings, it should be understood that the present disclosure may be implemented in various forms instead of being limited to the embodiments described herein. These embodiments are provided to understand the present disclosure more thoroughly and to entirely relay the scope claimed by the present disclosure to those skilled in the art.

Figure 1A:
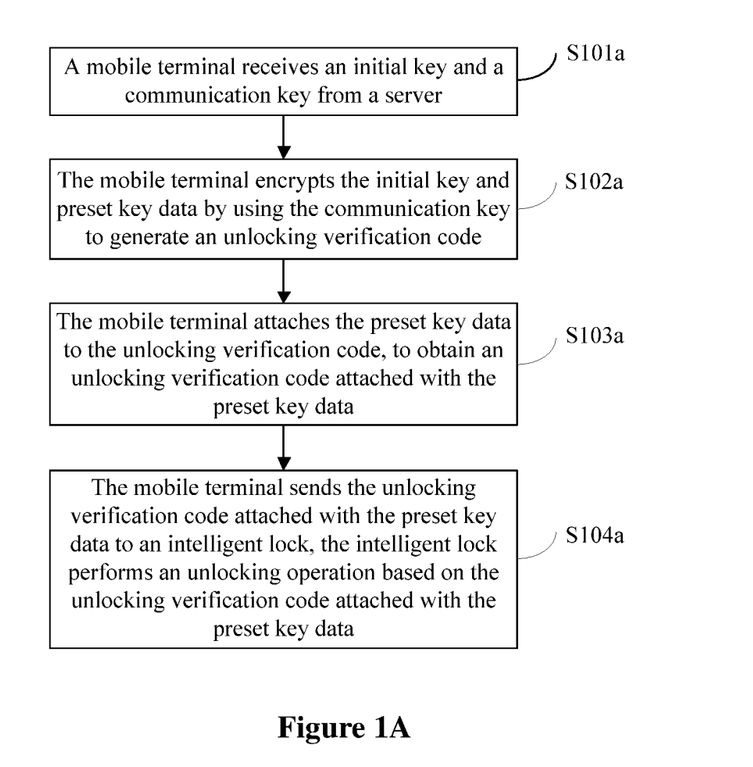
FIG. 1A is a schematic flowchart of a method for unlocking an intelligent lock according to an embodiment of the present disclosure.

Reference is made to FIG. 1a, which is a schematic flowchart of a method for unlocking an intelligent lock according to an embodiment of the present disclosure. The method is applied to a mobile terminal, and the method includes steps S101a to S104a.

In step S101a, a mobile terminal receives an initial key and a communication key from a server.

In practice, the server sends the initial key and the communication key to the mobile terminal, so that the mobile terminal performs an unlocking operation on an intelligent lock based on the initial key and the communication key.

In order to ensure the security of sending the initial key and the communication key, the server may send the initial key and the communication key through secure out-of-band transmission or a private encrypted channel.

In step S102a, the mobile terminal encrypts the initial key and preset key data by using the communication key to generate an unlocking verification code.

The preset key data may be a timestamp, or may be a count value of an up counter which is corresponding to the initial key and which is provided in the mobile terminal. The preset key data in this embodiment of the present disclosure is not limited to the foregoing two implementation manners.

In addition, the method of generating the unlocking verification code is specifically described later.

In step S103a, the mobile terminal attaches the preset key data to the unlocking verification code, to obtain an unlocking verification code attached with the preset key data.

In this embodiment of the present disclosure, after the mobile terminal generates the unlocking verification code, the mobile terminal attaches the preset key data to the unlocking verification code as plaintext, to obtain the unlocking verification code attached with the preset key data.

In step S104a, the mobile terminal sends the unlocking verification code attached with the preset key data to an intelligent lock, so that the intelligent lock performs an unlocking operation based on the unlocking verification code attached with the preset key data.

In practice, the mobile terminal sends the unlocking verification code attached with the preset key data to the intelligent lock, after the mobile terminal obtains the unlocking verification code attached with the preset key data.

In the method for unlocking an intelligent lock according to the disclosure, the initial key and the preset key data are encrypted by using the communication key to generate the unlocking verification code, the transmission of the unlocking verification code can prevent the initial key and the communication key from being tampered, thereby ensuring the safety of unlocking the intelligent lock and avoid property damage.

Figure 1B:
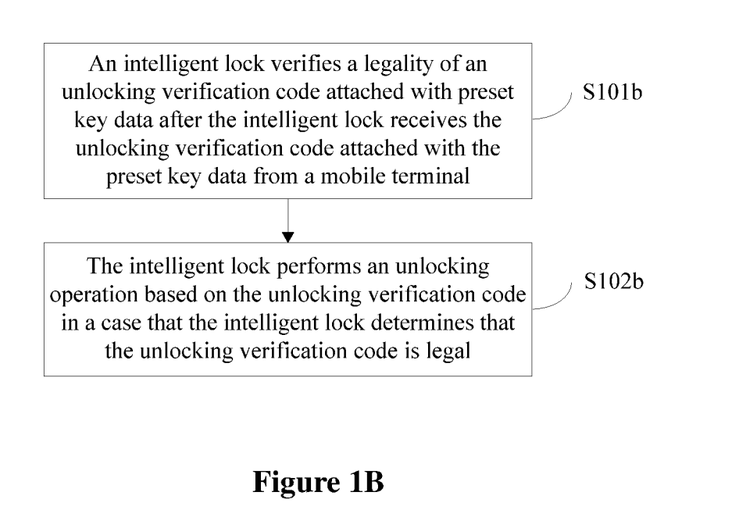
FIG. 1B is a schematic flowchart of a method for unlocking an intelligent lock according to another embodiment of the present disclosure.

Reference is made to FIG. 1b, which is a schematic flowchart of a method for unlocking an intelligent lock according to another embodiment of the present disclosure. The method is applied to an intelligent lock, and the method includes steps S101b to S102b.

In step S101b, an intelligent lock verifies a legality of an unlocking verification code attached with preset key data after the intelligent lock receives the unlocking verification code attached with the preset key data from a mobile terminal.

In this embodiment of the present application, after the intelligent lock receives the unlocking verification code attached with the preset key data, the intelligent lock verifies the legality of the unlocking verification code, to ensure a security of the received unlocking verification code attached with the preset key data during a transmission process of the received unlocking verification code. The method for verifying the legality of the unlocking verification code is described in detail later.

In step S102b, the intelligent lock performs an unlocking operation based on the unlocking verification code in a case that the intelligent lock determines that the unlocking verification code is legal.

In this embodiment of the present disclosure, in a case that the intelligent lock determines that the unlocking verification code is legal, the intelligent lock performs the unlocking operation based on the unlocking verification code. In a case that the intelligent lock determines that the unlocking verification code is illegal, the intelligent lock terminates the unlocking operation. The method of performing the unlocking operation based on the unlocking verification code is described in detail later.

In addition, the server sends the initial key and the communication key to the mobile terminal and the intelligent lock in advance, so that the mobile terminal and the intelligent lock perform the unlocking operation based on the initial key and the communication key.

Figure 1C:
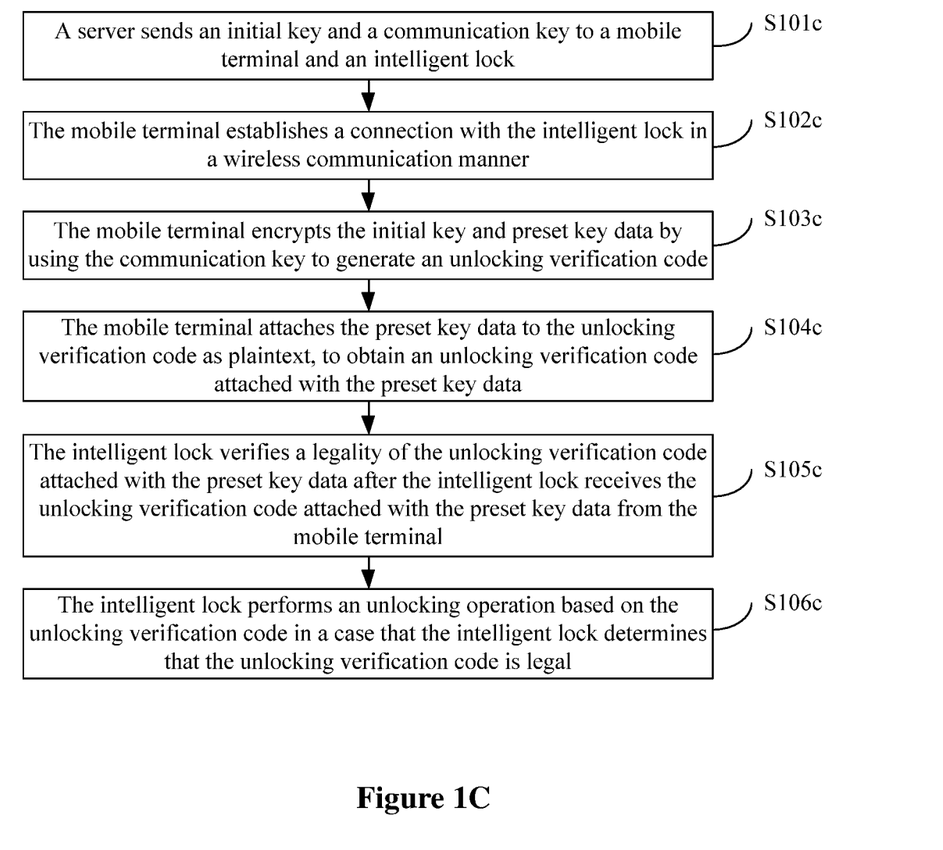
FIG. 1C is a schematic flowchart of a method for unlocking an intelligent lock according to another embodiment of the present disclosure.

The following provides a specific implementation scenario. Reference is made to FIG. 1c, which is a schematic flowchart of a method for unlocking an intelligent lock according to another embodiment of the present disclosure. The method is applied to a server, a mobile terminal, and an intelligent lock, and the method includes steps S101c to S106c.

In step S101c, a server sends an initial key and a communication key to a mobile terminal and an intelligent lock.

In an embodiment, after generating a set of an initial key and a communication key, the server may send the generated initial key and communication key to the mobile terminal and the intelligent lock in a preset manner. The preset manner may be secure out-of-band transmission or a private encrypted channel.

In practice, the initial key may be an initial Token, and the communication key may be a Key.

In step S102c, the mobile terminal establishes a connection with the intelligent lock in a wireless communication manner.

In an embodiment, the mobile terminal may establish a connection with the intelligent lock in a wireless communication manner of Bluetooth, zigbee or WIFI.

In step S103c, the mobile terminal encrypts the initial key and preset key data by using the communication key to generate an unlocking verification code.

Figure 2:
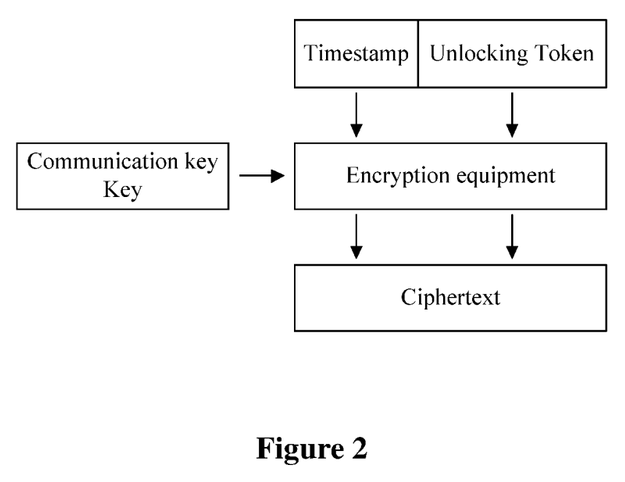
FIG. 2 is a schematic diagram of encryption according to an embodiment of the present disclosure.

In an embodiment, the preset key data may be a timestamp Timestamp. As shown in FIG. 2, the mobile terminal encrypts the initial key, i.e., unlocking Token and the timestamp by using the communication key Key, to obtain the ciphertext, i.e., the unlocking verification code.

Figure 3:
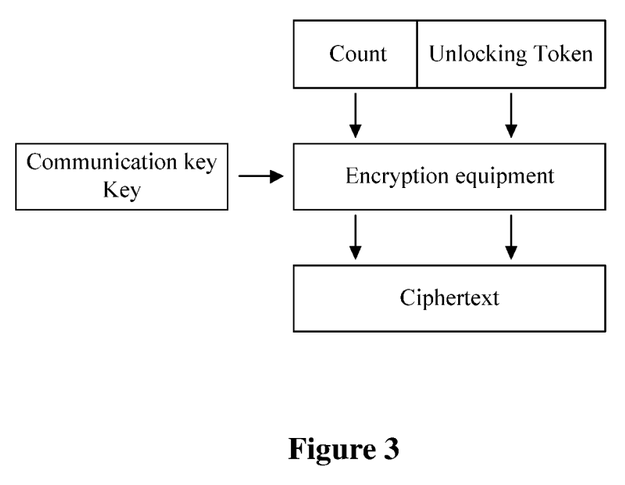
FIG. 3 is a schematic diagram of encryption according to another embodiment of the present disclosure.

In another embodiment, the mobile terminal is provided with an up counter corresponding to the initial key, and the preset key data is a count value Count of the up counter. The count value of the up counter corresponding to the initial key is incremented by one in response to the mobile terminal receiving the initial key and the communication key from the server. As shown in FIG. 3, the mobile terminal encrypts the initial key, i.e., unlocking Token and the count value Count by using the communication key Key, to obtain the ciphertext, i.e., the unlocking verification code.

In step S104c, the mobile terminal attaches the preset key data to the unlocking verification code as plaintext, to obtain an unlocking verification code attached with the preset key data.

After the mobile terminal generates the unlocking verification code, in order to ensure the safety of the unlocking verification code during a transmission process, the mobile terminal attaches the preset key data to the unlocking verification code as plaintext, to obtain the unlocking verification code attached with the preset key data.

In an embodiment, the mobile terminal may attach a current timestamp to the unlocking verification code, to generate an unlocking verification code attached with the timestamp, and the mobile terminal sends the unlocking verification code attached with the timestamp to the intelligent lock. For example, if the current timestamp is 2016-08-11-20:21, this timestamp may be attached to the unlocking verification code, to generate the unlocking verification code attached with the timestamp, and the unlocking verification code attached with the timestamp is sent to the intelligent lock.

In step S105c, the intelligent lock verifies a legality of the unlocking verification code attached with the preset key data after the intelligent lock receives the unlocking verification code attached with the preset key data from the mobile terminal.

In an embodiment, the preset key data is a timestamp, the intelligent lock calculates a time period from the timestamp to a time of a local clock module of the intelligent lock. The intelligent lock determines that the unlocking verification code is illegal, in a case that the time period is greater than a preset threshold. The intelligent lock determines that the unlocking verification code is legal, in a case that the time period is not greater than the preset threshold. In a case that the intelligent lock determines that the unlocking verification code is illegal, the intelligent lock feeds a comparison result indicating that the unlocking verification code is illegal to the mobile terminal via Bluetooth. In addition, the preset threshold may be determined according to the actual situation, and is usually set to be in a range from 15 minutes to 60 minutes. Assuming that the preset threshold is 20 minutes, the intelligent lock determines that the unlocking verification code is illegal, in a case that the time period is greater than 20 minutes.

In addition, if it is determined that the unlocking verification code is legal, it may be further determined whether the unlocking verification code is tampered. For example, it is determined whether the unlocking verification code is tampered by comparing the timestamp attached to the unlocking verification code with a timestamp obtained by decoding the unlocking verification code. If the timestamp attached to the unlocking verification code is the same as the timestamp obtained by decoding the unlocking verification code, it is determined that the unlocking verification code is not tampered. If the timestamp attached to the unlocking verification code is different from the timestamp obtained by decoding the unlocking verification code, it is determined that the unlocking verification code is tampered. Steps S106c is performed in a case that it is determined that the unlocking verification code is not tampered.

In practice, the local clock module is a clock chip that is powered by a button battery. For example, the intelligent lock is powered by an AA dry battery. Even before and after replacing the AA battery, the clock module in the intelligent lock remains in normal operation. The time of the clock module is a standard time which is automatically matched and updated. For example, the current standard time is 17:00, the time of the clock module is also 17:00.

In another embodiment, the preset key data is a count value of an up counter, the intelligent lock compares the count value of the up counter attached to the unlocking verification code with a count value of a local counter of the intelligent lock. The intelligent lock determines that the unlocking verification code is legal, in a case that the count value of the up counter is greater than the count value of the local counter. The intelligent lock determines that the unlocking verification code is illegal, in a case that the count value of the up counter is less than or equal to the count value of the local counter.

In practice, each of the mobile terminal and the intelligent lock stores a count value Count of an up counter for each initial key. The count value Count of the up counter in the mobile terminal is incremented by one before each unlocking. The mobile terminal encrypts the initial key and the count value of the up counter by using the communication key and an encryption algorithm, to generate an unlocking verification code.

In step S106c, the intelligent lock performs an unlocking operation based on the unlocking verification code in a case that the intelligent lock determines that the unlocking verification code is legal.

In an embodiment, the intelligent lock decodes the unlocking verification code by using the preset key data in the plaintext and a communication key locally stored in the intelligent lock to obtain a to-be-matched initial key, in a case that the intelligent lock determines that the unlocking verification code is legal. The intelligent lock matches the to-be-matched initial key with an initial key locally stored in the intelligent lock. The intelligent lock performs the unlocking operation in a case that the to-be-matched initial key is successfully matched with the initial key locally stored in the intelligent lock.

In practice, after the intelligent lock performs the unlocking operation, the intelligent lock synchronizes the time of the local clock module with the timestamp, to update the time of the local clock module.

In another embodiment, the intelligent lock matches the unlocking verification code with a legal verification code locally generated in the intelligent lock in advance, in a case that the intelligent lock determines that the unlocking verification code is legal. The legal verification code is generated by encrypting an initial key locally stored in the intelligent lock and the preset key data by using a communication key locally stored in the intelligent lock. The intelligent lock performs the unlocking operation in a case that the unlocking verification code is successfully matched with the legal verification code. That is, the unlocking operation is performed only when an unlocking verification code, which is the same as any legal verification code, is received.

In practice, after the intelligent lock performs the unlocking operation, the intelligent lock updates the count value of the local counter to be the count value of the up counter.

In the method for unlocking an intelligent lock according to the disclosure, the initial key and the preset key data are encrypted by using the communication key to generate the unlocking verification code, the transmission of the unlocking verification code can prevent the initial key and the communication key from being tampered, thereby ensuring the safety of unlocking the intelligent lock and avoid property damage.

Based on the description of the foregoing embodiments, following two specific methods for unlocking an intelligent lock are provided according to the present disclosure.

First Example

Figure 4:
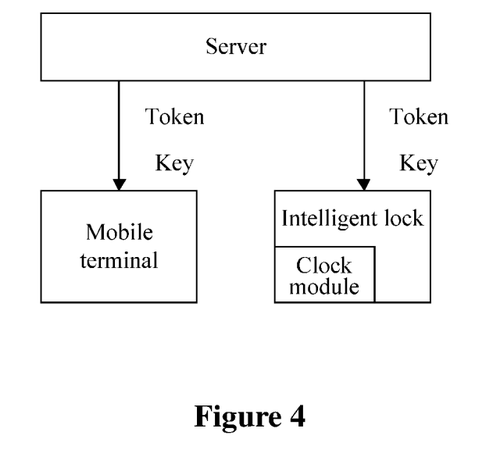
FIG. 4 is a schematic flowchart of step (1) of a method for unlocking an intelligent lock according to a first example of the present disclosure.
Figure 5:
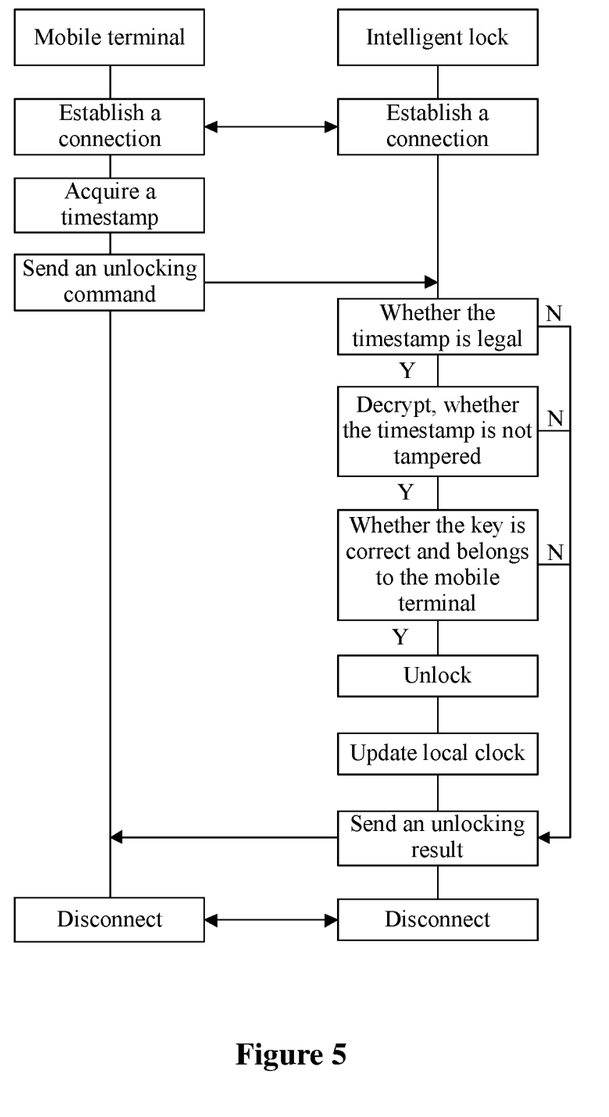
FIG. 5 is a schematic flowchart of steps (2)-(8) of the method for unlocking an intelligent lock according to the first example of the present disclosure.

Reference is made to FIG. 4 and FIG. 5, FIG. 4 is a schematic flowchart of step (1) of a method for unlocking an intelligent lock according to the first example of the present disclosure. FIG. 5 is a schematic flowchart of steps (2)-(8) of the method for unlocking an intelligent lock according to the first example of the present disclosure. The method for unlocking an intelligent lock according to the first example includes steps (1) to (8).

In step (1), a server generates a Bluetooth key, and the server sends the Bluetooth key to a mobile terminal and an intelligent lock through secure out-of-band transmission or a private encrypted channel.

In step (2), the mobile terminal establishes a connection with the intelligent lock in a wireless communication manner of Bluetooth or zigbee. Alternatively, the mobile terminal establishes a Bluetooth connection with the intelligent lock through Bluetooth key verification.

In step (3), an initial key is an initial Token, and the mobile terminal encrypts the unlocking Token and a timestamp Timestamp by using a communication key Key, to generate an unlocking verification code.

In step (4), the mobile terminal attaches a current time stamp to the unlocking verification code to generate an unlocking verification code attached with the current time stamp, and the mobile terminal sends the unlocking verification code attached with the current time stamp to the intelligent lock.

In step (5), the intelligent lock compares the time stamp with a time of a clock module of the intelligent lock. The intelligent lock determines that the unlocking verification code is an illegal data packet and feeds the verification result back to the mobile terminal through Bluetooth, in a case that a time period from the timestamp in the plaintext to the time of the local clock module is greater than a preset threshold. The preset threshold is usually set to be in a range from 15 minutes to 60 minutes according to actual requirement. Assuming that the preset threshold is 20 minutes, the intelligent lock determines that the unlocking verification code is an illegal data packet and feeds the verification result back to the mobile terminal through Bluetooth, in a case that the time period is greater than 20 minutes. In this way, it is avoided transmission of an illegal time value and replaying of previous unlocking information.

The local clock module is a clock chip that is powered by a button battery. For example, the intelligent lock is powered by an AA dry battery. Even before and after replacing the AA battery, the clock module in the intelligent lock remains in normal operation. The time of the clock module is a standard time which is automatically matched and updated. For example, the current standard time is 17:00, the time of the clock module is also 17:00.

In step (6), in a case that the time period is not greater than the preset threshold, the unlocking verification code is decoded by using the timestamp. The timestamp in the unlocking verification code is compared with the timestamp in the plaintext, to determine whether the plaintext portion of the data packet has been tampered.

The timestamp in the unlocking verification code is compared with the timestamp in the plaintext of the unlocking verification code attached with the timestamp, to determine whether the plaintext portion of the unlocking verification code attached with the timestamp has been tampered. It is determined that the plaintext portion of the unlocking verification code attached with the timestamp has not been tampered in a case that the timestamp in the unlocking verification code is the same as the timestamp in the plaintext of the unlocking verification code attached with the timestamp. It is determined that the plaintext portion of the unlocking verification code attached with the timestamp has been tampered in a case that the timestamp in the unlocking verification code is different from the timestamp in the plaintext of the unlocking verification code attached with the timestamp.

It is determined that the unlocking verification code attached with the timestamp is legal, if it is determined that the plaintext portion of the unlocking verification code attached with the timestamp has not been tampered. It is determined that the unlocking verification code attached with the timestamp is illegal and the verification result is fed back to the mobile terminal through Bluetooth, if it is determined that the plaintext portion of the unlocking verification code attached with the timestamp has been tampered.

In step (7), if it is determined that the unlocking verification code attached with the timestamp is legal, the initial key obtained by decoding is compared with a legal key stored in the intelligent lock and it is determined whether the initial key and the legal key in the intelligent lock belongs to the combination of the mobile terminal and the intelligent lock.

It is determined that the matching is successful, the verification result is fed back to the mobile terminal through Bluetooth, and the intelligent lock performs the unlocking operation, in a case that the initial key is the same as the legal key stored in the intelligent lock and the initial key and the legal key in the intelligent lock belongs to the combination of the mobile terminal and the intelligent lock.

In step (8), the intelligent lock synchronizes the timestamp in the unlocking verification code attached with the timestamp, which is sent by the mobile terminal, with the time in the intelligent lock, and the Bluetooth connection is disconnected.

Second Example

Figure 6:
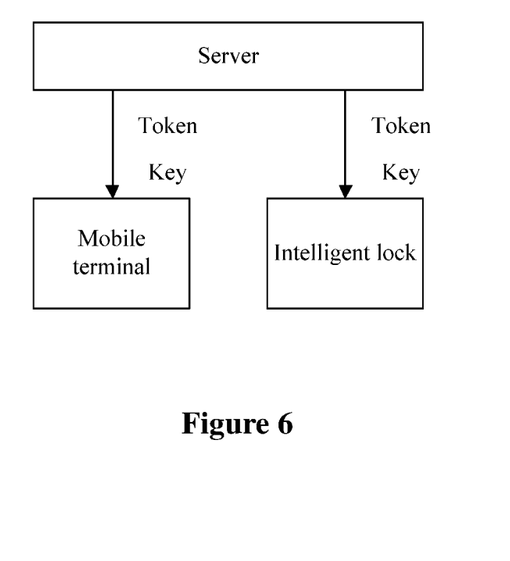
FIG. 6 is a schematic flowchart of step (1) of a method for unlocking an intelligent lock according to a second example of the present disclosure.
Figure 7:
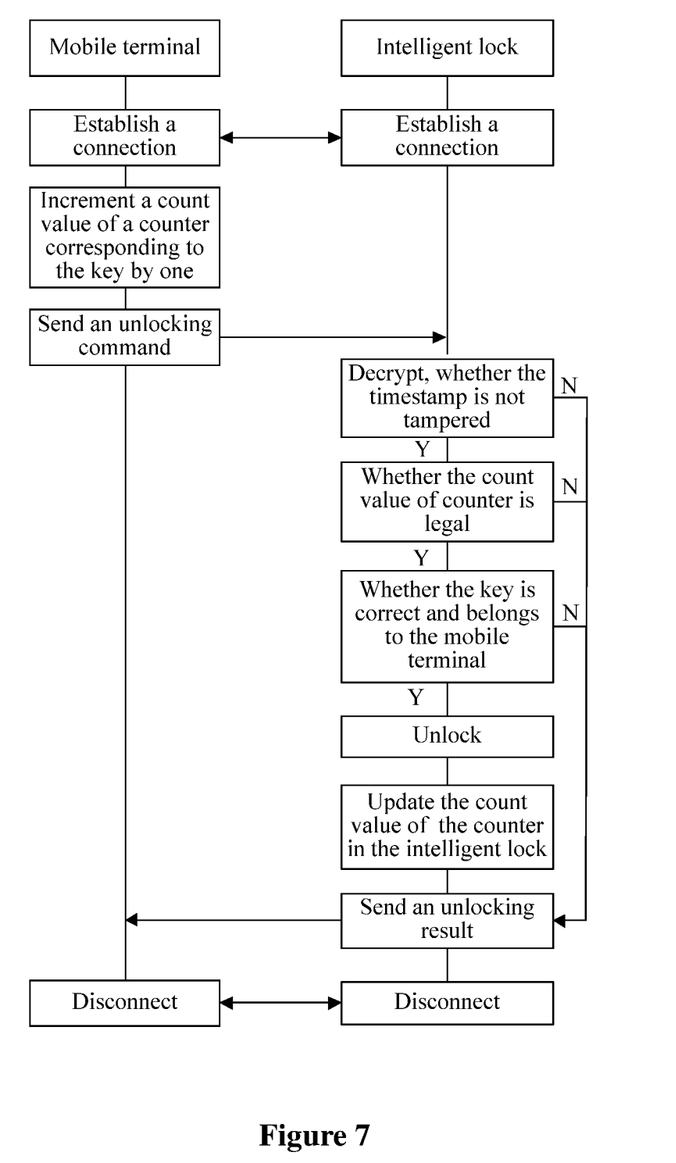
FIG. 7 is a schematic flowchart of steps (2)-(8) of the method for unlocking an intelligent lock according to the second example of the present disclosure.

Reference is made to FIG. 6 and FIG. 7, FIG. 6 is a schematic flowchart of step (1) of a method for unlocking an intelligent lock according to the second example of the present disclosure. FIG. 7 is a schematic flowchart of steps (2)-(8) of the method for unlocking an intelligent lock according to the second example of the present disclosure. The method for unlocking an intelligent lock according to the second example includes steps (1) to (8).

In step (1), a server generates a Bluetooth key, and the server sends the Bluetooth key to a mobile terminal and an intelligent lock through secure out-of-band transmission or a private encrypted channel.

In step (2), the mobile terminal establishes a connection with the intelligent lock in a wireless communication manner of Bluetooth or zigbee. Alternatively, it is determined whether the initial key of the mobile terminal is the same as the initial key of the intelligent lock, and the mobile terminal establishes a Bluetooth connection with the intelligent lock in a case that the initial key of the mobile terminal is the same as the initial key of the intelligent lock.

In step (3), each of the mobile terminal and the intelligent lock stores a count value Count of an up counter for each initial key. The count value Count of the up counter in the mobile terminal is incremented by one before each unlocking. The counting range is large enough to ensure the count value Count does not go beyond the counting range during the life of the intelligent lock. The initial key is an initial Token, and the mobile terminal encrypts the initial Token and preset key data by using a communication key Key, to generate an unlocking verification code. The preset key data may be the count value Count and/or the timestamp Timestamp.

In step (4), the mobile terminal attaches a current time stamp to the unlocking verification code to generate an unlocking verification code attached with the current time stamp, and the mobile terminal sends the unlocking verification code attached with the current time stamp to the intelligent lock.

In step (5), the intelligent lock decodes the unlocking verification code by using the timestamp. The timestamp in the unlocking verification code is compared with the timestamp in the plaintext, to determine whether the plaintext portion of the data packet has been tampered.

The timestamp in the unlocking verification code is compared with the timestamp in the plaintext of the unlocking verification code attached with the timestamp, to determine whether the plaintext portion of the unlocking verification code attached with the timestamp has been tampered. It is determined that the plaintext portion of the unlocking verification code attached with the timestamp has not been tampered in a case that the timestamp in the unlocking verification code is the same as the timestamp in the plaintext of the unlocking verification code attached with the timestamp. It is determined that the plaintext portion of the unlocking verification code attached with the timestamp has been tampered in a case that the timestamp in the unlocking verification code is different from the timestamp in the plaintext of the unlocking verification code attached with the timestamp. The verification result is fed back to the mobile terminal through Bluetooth, if it is determined that the plaintext portion of the unlocking verification code attached with the timestamp has been tampered.

In step (6), a count value of the counter sent from the intelligent lock is compared with a count value of a local counter, if it is determined that the plaintext portion of the unlocking verification code attached with the timestamp has not been tampered. It is determined that the unlocking verification code attached with the timestamp is legal, in a case that the count value of the counter sent from the intelligent lock is greater than the count value of the local counter. It is determined that the data packet is replayed and the unlocking verification code attached with the timestamp is illegal, and the verification result is fed back to the mobile terminal through Bluetooth, in a case that the count value of the counter sent from the intelligent lock is less than or equal to the count value of the local counter.

In step (7), if it is determined that the unlocking verification code attached with the timestamp is legal, the initial key unlocking Token obtained by decoding is compared with a legal key legal Token stored in the intelligent lock and it is determined whether the initial key and the legal key in the intelligent lock belongs to the combination of the mobile terminal and the intelligent lock.

It is determined that the matching is successful, the verification result is fed back to the mobile terminal through Bluetooth, and the intelligent lock performs the unlocking operation, in a case that the initial key is the same as the legal key stored in the intelligent lock and the initial key and the legal key in the intelligent lock belongs to the combination of the mobile terminal and the intelligent lock.

(8) The count value of the counter in the intelligent lock is updated to be the count value of the counter sent from the mobile terminal, and the Bluetooth connection is disconnected.

Stealing, tampering, and replaying of a Bluetooth key in a process of unlocking an intelligent lock is avoided according to the above first example and second example. In the first example, the intelligent lock includes a clock module, replaying of a Bluetooth key is avoided by using the time non-reversible feature. In the second example, replaying of a Bluetooth key is avoided without relating to the time, which is more widely applied, it is avoided time deviations that occur in the case of long-term unsynchronization.

Figure 8:
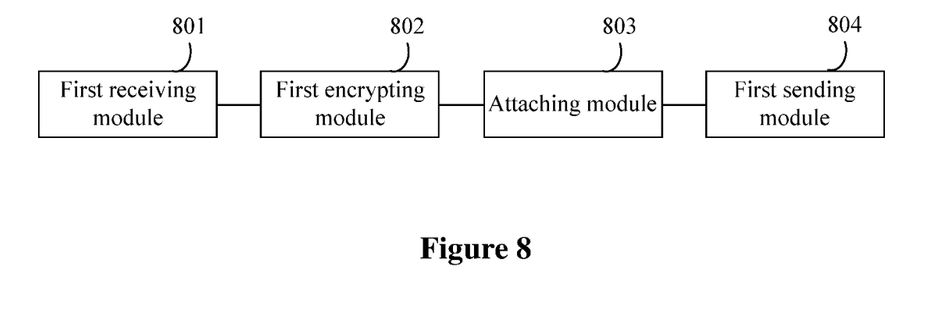
FIG. 8 is a schematic diagram of a mobile terminal according to an embodiment of the present disclosure.

Corresponding to the foregoing method embodiment, a mobile terminal is provided according to an embodiment of the disclosure. Reference is made to FIG. 8, which is a schematic diagram of a mobile terminal according to an embodiment of the present disclosure. The mobile terminal includes a first receiving module 801, a first encrypting module 802, an attaching module 803 and a first sending module 804.

The first receiving module 801 is configured to receive an initial key and a communication key from a server.

The first encrypting module 802 is configured to encrypt the initial key and preset key data by using the communication key to generate an unlocking verification code.

The attaching module 803 is configured to attach the preset key data to the unlocking verification code, to obtain an unlocking verification code attached with the preset key data.

The first sending module 804 is configured to send the unlocking verification code attached with the preset key data to an intelligent lock, so that the intelligent lock performs an unlocking operation based on the unlocking verification code attached with the preset key data.

In an embodiment, the preset key data is a timestamp.

In an embodiment, the mobile terminal is provided with an up counter corresponding to the initial key, and the preset key data is a count value of the up counter. The count value of the up counter is incremented by one in response to the mobile terminal receiving the initial key and the communication key from the server.

In an embodiment, the mobile terminal further includes a connection module configured to establish a connection with the intelligent lock in a wireless communication manner of Bluetooth, zigbee or WIFI.

Figure 9:
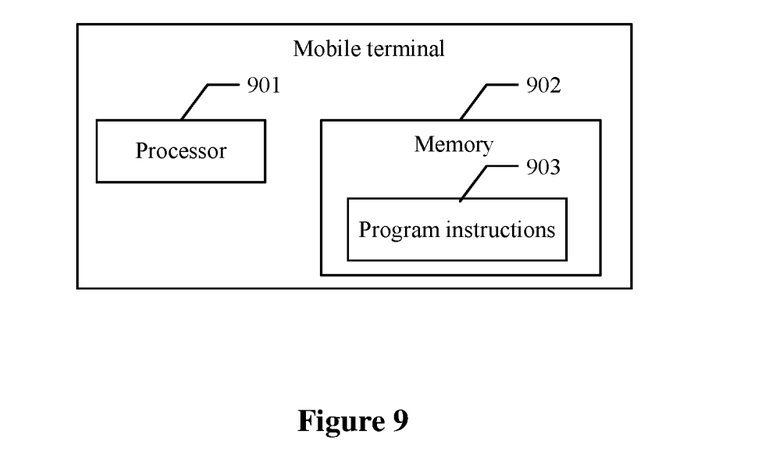
FIG. 9 is a schematic diagram of a mobile terminal according to another embodiment of the present disclosure.

Reference is made to FIG. 9, which is a schematic diagram of a mobile terminal according to another embodiment of the present disclosure. The mobile terminal includes a processor 901 and a memory 902. The memory 902 stores program instructions 903. The processor 901 executes the program instructions 903 to perform the method for unlocking an intelligent lock applied to a mobile terminal.

Figure 10:
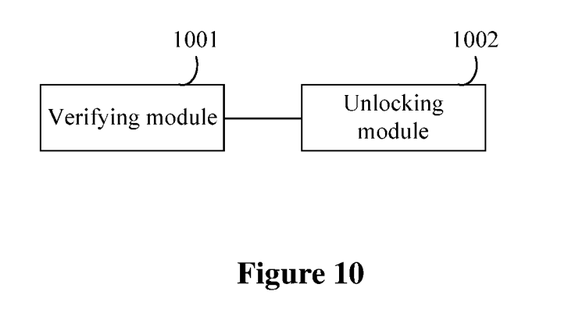
FIG. 10 is a schematic diagram of an intelligent lock according to an embodiment of the present disclosure.

Reference is made to FIG. 10, which is a schematic diagram of an intelligent lock according to an embodiment of the present disclosure. The intelligent lock includes a verifying module 1001 and an unlocking module 1002.

The verifying module 1001 is configured to verify a legality of an unlocking verification code attached with preset key data after the intelligent lock receives the unlocking verification code attached with the preset key data from a mobile terminal.

The unlocking module 1002 is configured to perform an unlocking operation based on the unlocking verification code in a case that the intelligent lock determines that the unlocking verification code is legal.

In an embodiment, the preset key data is a timestamp, and the verifying module includes a first comparing sub-module, a first determining sub-module and a second determining sub-module.

The first comparing sub-module is configured to calculate a time period from the timestamp to a time of a local clock module of the intelligent lock. The time of the local clock module is a standard time which is automatically matched and updated.

The first determining sub-module is configured to determine that the unlocking verification code is illegal, in a case that the time period from the timestamp to the time of the local clock module is greater than a preset threshold.

The second determining sub-module is configured to determine that the unlocking verification code is legal, in a case that the time period from the timestamp to the time of the local clock module is not greater than the preset threshold.

In an embodiment, the intelligent lock further includes a synchronizing module configured to synchronize the time of the local clock module with the timestamp.

In an embodiment, the preset key data is a count value of an up counter, and the verifying module includes a second comparing sub-module, a third determining sub-module and a fourth determining sub-module.

The second comparing sub-module is configured to compare the count value of the up counter attached to the unlocking verification code with a count value of a local counter of the intelligent lock.

The third determining sub-module is configured to determine that the unlocking verification code is legal, in a case that the count value of the up counter is greater than the count value of the local counter.

The fourth determining sub-module is configured to determine that the unlocking verification code is illegal, in a case that the count value of the up counter is less than or equal to the count value of the local counter.

In an embodiment, the intelligent lock further includes an updating module configured to update the count value of the local counter to be the count value of the up counter.

In an embodiment, the unlocking module includes a decoding sub-module, a first matching sub-module and a first unlocking sub-module.

The decoding sub-module is configured to decode the unlocking verification code by using the preset key data and a communication key locally stored in the intelligent lock to obtain a to-be-matched initial key, in a case that the intelligent lock determines that the unlocking verification code is legal.

The first matching sub-module is configured to match the to-be-matched initial key with an initial key locally stored in the intelligent lock.

The first unlocking sub-module is configured to perform the unlocking operation in a case that the to-be-matched initial key is successfully matched with the initial key locally stored in the intelligent lock.

In an embodiment, the unlocking module includes a second matching sub-module and a second unlocking sub-module.

The second matching sub-module is configured to match the unlocking verification code with a legal verification code locally generated in the intelligent lock in advance, in a case that the intelligent lock determines that the unlocking verification code is legal. The legal verification code is generated by encrypting an initial key locally stored in the intelligent lock and the preset key data by using a communication key locally stored in the intelligent lock.

The second unlocking sub-module is configured to perform the unlocking operation in a case that the unlocking verification code is successfully matched with the legal verification code locally generated in the intelligent lock.

Figure 11:
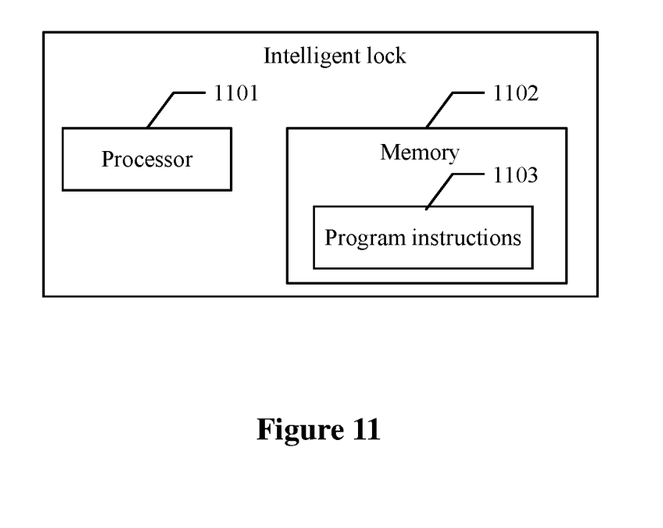
FIG. 11 is a schematic diagram of an intelligent lock according to another embodiment of the present disclosure.

Reference is made to FIG. 11, which is a schematic diagram of an intelligent lock according to another embodiment of the present disclosure. The intelligent lock includes a processor 1101 and a memory 1102. The memory 1102 stores program instructions 1103. The processor 1101 executes the program instructions 1103 to perform the method for unlocking an intelligent lock applied to an intelligent lock.

In addition, a server is provided according to the disclosure. The server includes a sending module configured to send an initial key and a communication key to a mobile terminal and an intelligent lock. The mobile terminal and the intelligent lock perform an unlocking operation based on the initial key and the communication key.

In an embodiment, the sending module is further configured to send the initial key and the communication key to the mobile terminal and the intelligent lock through secure out-of-band transmission or a private encrypted channel.

The sequence numbers of the preceding embodiments of the present disclosure are merely for description purpose but do not indicate the preference of the embodiments.

In the foregoing embodiments of the present disclosure, descriptions of the embodiments have different emphases, and as for parts that are not described in detail in one embodiment, reference can be made to the relevant description of the other embodiments.

In some embodiments of the present application, it should be understood that the disclosed technical contents may be implemented in other manners. The embodiments for device described above are only schematic. For example, the units may be classified based on logical functions. In actual implementation, the units may be classified in other manners. For example, multiple units or components may be combined or integrated into another system, or some features may be ignored or not executed. Further, the mutual coupling, direct coupling or communication connection shown or discussed may be an indirect coupling or communication connection via some interfaces, units or modules, and may be electrical or have other types.

The units described as separate components may or may not be physically separated. The components shown as units may or may not be physical units, that is, the components may be located in one location, or may be distributed to multiple units. Some or all of the units may be selected based on actual needs to achieve the object of the technical solutions of the embodiment.

In addition, all function units according to the embodiment of the present disclosure may be integrated into one processing unit, or may be a physically separate unit, or may be one unit that is integrated by two or more units. The above integrated unit may be implemented in the form of hardware or in the form of a software functional unit.

The above description is preferred embodiments of the present disclosure, however, it should be noted that several improvements and modifications can be made thereto by those ordinary skilled in the art without departing from the principle of the present disclosure, and these improvements and modifications should also be deemed to be within the protection scope of the present disclosure.

What is claimed is:

1. A method for unlocking an intelligent lock, comprising:
receiving, by a mobile terminal, an initial key and a communication key from a server;
encrypting, by the mobile terminal, the initial key and preset key data by using the communication key to generate an unlocking verification code;
attaching, by the mobile terminal, the preset key data to the unlocking verification code, to obtain an unlocking verification code attached with the preset key data; and
sending, by the mobile terminal, the unlocking verification code attached with the preset key data to the intelligent lock, wherein the intelligent lock performs an unlocking operation based on the unlocking verification code attached with the preset key data.

2. The method according to claim 1, wherein the preset key data is a timestamp.

3. The method according to claim 1, wherein the mobile terminal is provided with an up counter corresponding to the initial key, and the preset key data is a count value of the up counter, the count value of the up counter is incremented by one in response to the mobile terminal receiving the initial key and the communication key from the server.

4. The method according to claim 1, before the mobile terminal sends the unlocking verification code attached with the preset key data to the intelligent lock, further comprising:

establishing, by the mobile terminal, a connection with the intelligent lock in a wireless communication manner of Bluetooth, zigbee or Wireless Fidelity (WIFI).

5. A mobile terminal, comprising:

a processor; and a memory storing program instructions, when executed by the processor, causing the processor to perform the method for unlocking the intelligent lock according to claim 1.

\* \* \* \* \*